No. 813,097. PATENTED FEB. 20, 1906.
K. R. HOWARD.
GAS METER.
APPLICATION FILED JUNE 21, 1905.
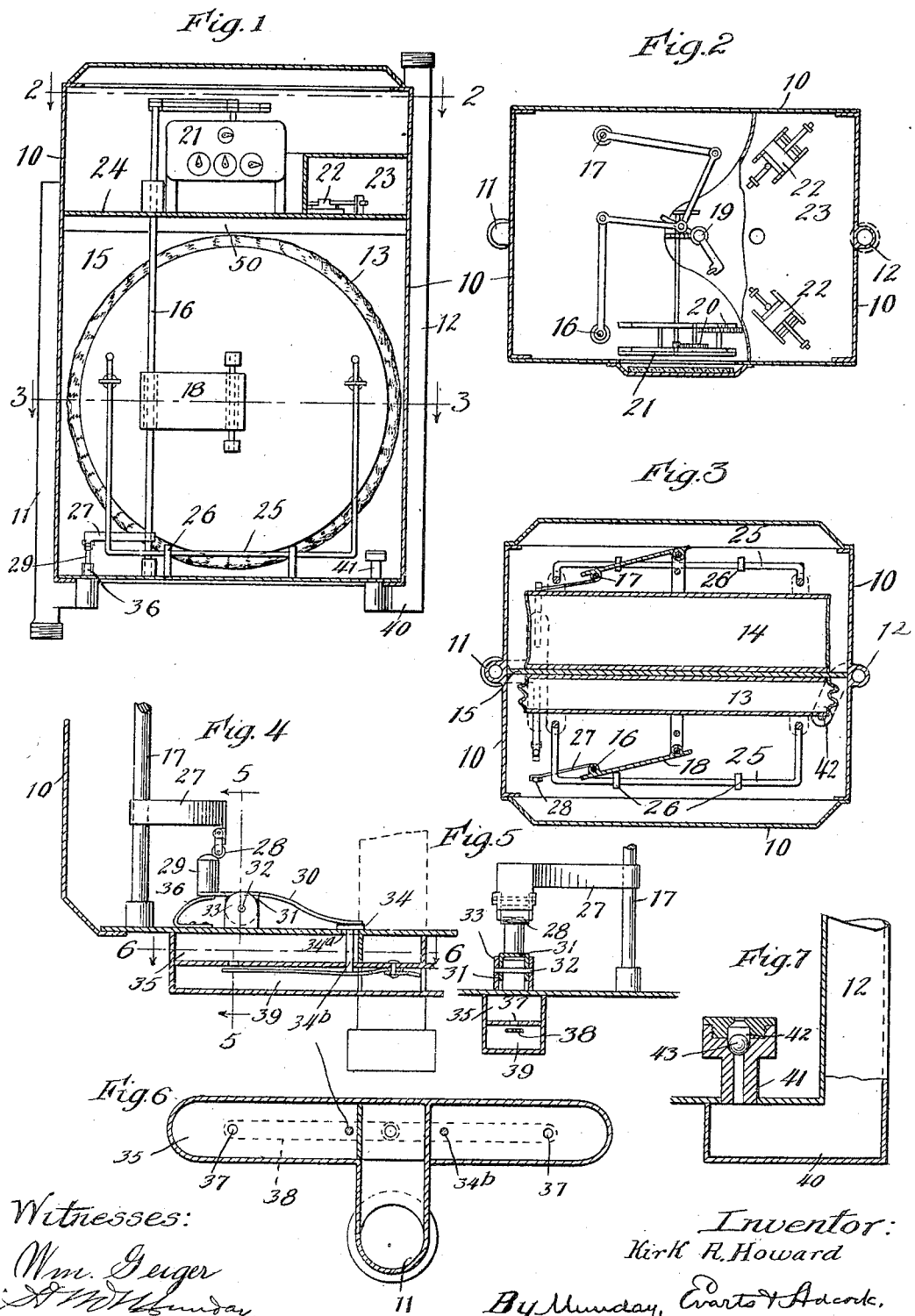
Witnesses:
Wm. Geiger
H. W. Munday
Inventor:
Kirk R. Howard
By Munday, Evarts & Adcock,
Attorneys

UNITED STATES PATENT OFFICE.

KIRK R. HOWARD, OF CHICAGO, ILLINOIS.

GAS-METER.

No. 813,097.  Specification of Letters Patent.  Patented Feb. 20, 1906.

Application filed June 21, 1905. Serial No. 266,214.

*To all whom it may concern:*

Be it known that I, KIRK R. HOWARD, a citizen of the United States, residing in Chicago, in the county of Cook and State of Illinois, have invented a new and useful Improvement in Gas-Meters, of which the following is a specification.

In the use of dry gas-meters much trouble is experienced, especially in cold weather, from the gathering therein of the water of condensation from the pipes, causing flickering and unevenness in the flow of the gas, so that the lights are rendered unsteady and their brightness is frequently dimmed. To remedy this evil, I have conceived means whereby the water may be automatically drained from the meter without affecting its operation in the performance of its function of measuring the amount of gas passing through it. These means consist of valves which are automatically and periodically opened by power from the bellows of the meter and which allow the water to flow off as fast or faster than it accumulates, and they will be fully understood from the accompanying drawings, in which—

Figure 1 is a vertical section of a meter furnished with my improvement. Figs. 2 and 3 are sections on the lines 2 2 and 3 3, respectively, of Fig. 1. Fig. 4 is a partial vertical section. Figs. 5 and 6 are sections on the lines 5 5 and 6 6 of Fig. 4. Fig. 7 is a detail view section of a check-valve used in the meter.

In said drawings, 10 represents the outer casing of the meter, 11 the gas-inlet leading from the main, and 12 the gas-outlet connected to the riser-pipes of the house or building to be lighted or heated. Within the casing are the ordinary measuring - bellows 13 and 14, each in a chamber of its own upon one side of the vertical partition 15. By the alternate filling and deflating of these bellows the vertical rock - shafts 16 and 17, attached to the moving side of the bellows by the flags 18, are actuated, and the rocking of said shafts is transformed into a continuous rotation by the shaft 19, from which the train of gears 20, actuating the pointers of the dial 21, receive their power. The usual slide-valves located in valve-chamber 23 and regulating the entrance of the gas to and from the bellows and their chambers are shown at 22, and casing is also divided horizontally by a floor or partition 24, located above the bellows. The gas moves from the inlet-pipe 11 to the valve-chamber 23 through the passage shown at 50, Fig. 1, and located below the floor 24. The usual U - shaped frame 25, rocking in bearings 26 and serving to secure uniform movement by all parts of the moving side of the bellows, are also shown.

As thus far described the meter is of a well-known construction, except that the inlet-pipe 11 has its mouth at the bottom instead of the top. To this well-known construction I apply my invention as follows: I locate the mouth of the inlet-pipe at the bottom instead of the top, as heretofore, and therefore prevent the condensations from standing in that pipe, and I also give exit into that pipe from the interior of the meter to such water as collects therein. For this latter purpose the rock-shafts 16 and 17 are each provided with an arm 27, preferably carrying a roller 28, and this arm in the movements of the rocking shaft passes over and depresses the stud 29 on a lever 30, having depending ears 31, mounted on a pivot 32, supported from the bottom of the bellows-chamber in uprights 33. One end of the lever carries a valve 34, closing the opening 34$^a$ in the bottom of the bellows - chamber. A pin 34$^b$ passes through said opening in the bottom of the bellows-chamber and through a supplemental chamber 35, the only inlet to which supplemental chamber is closed by the valve. The lever is caused to keep the valve 34 closed normally by a spring 36, tending to lift the end carrying the stud, and the outlet 37 from chamber 35 is shown as being controlled by a long flat spring 38, secured at one end to a stationary part—as, for instance, the bottom of chamber 35—and acting at its free end to close said outlet. The pin 34$^b$ also extends through the bottom of chamber 35 and bears upon the spring 38 in such manner as to hold the latter away from the outlet when the valve 34 is closed and presses upon it. The spring 38 closes the outlet 37 whenever the pressure by valve 34 is relieved from the pin 34$^b$ by the depressing of the stud 29, as already described. Below the supplemental chamber is a passage 39, acting to carry the water from outlet 37 into the supply-pipe 11. The operation of this part of the device will be readily understood. The opening of valve 34 allows any water then standing in the bellows-chamber to enter chamber 35, where it is trapped for a short time, the spring-valve 38 being closed whenever valve 34 is opened and remaining closed until valve 34 again closes. Upon the closing of valve 34 valve 38 opens and allows the water to pass into pipe 11. These operations are wholly automatic, and by it any accumulation of condensation-water in the bellows-chamber is wholly prevented, and as these automatic valves and their controlling means are duplicated in the other bellows-chamber it follows that the entire meter is kept free of water. Inasmuch as the water also accumulates in pipe 12 from the house-pipes, I provide the bottom of said pipe with a branch 40 and an upward extension 41, the latter opening into one of the bellows-chambers, as shown at Figs. 1 and 7. In the extension 41 I form a valve-chamber 42, and in said chamber a check-valve 43 is placed. This valve is adapted to yield and allow the water from pipe 12 to flow into the bellows-chamber whenever an excessive amount of water is present in pipe 12. This form of valve I deem to be the best form for the place; but of course other suitable forms of automatic valves may be used. The water from pipe 12 is drawn from the bellows-chamber along with the other condensations by the means already described.

I claim—

1. The dry gas-meter having its valve-chamber and slide-valves located above the measuring-bellows, and also having openings in the bottom of the bellows-chambers for drawing off the water of condensation, valves controlling such openings, and means for operating said valves.

2. In a gas-meter having its valve-chamber and slide-valves located above the measuring-bellows, and also having openings in the bottom of the bellows-chambers for drawing off the water of condensation, chambers under such openings discharging into the gas-supply pipe, valves controlling such openings, and means for operating said valves.

3. The dry meter having measuring-bellows and chambers, valves located above the bellows regulating the gas-supply thereto, openings for the discharge of water of condensation formed in the bottom of the bellows-chambers, valves at said openings and means whereby the last-mentioned valves may be operated at intervals by the bellows.

4. The dry meter having measuring-bellows and chambers, valves located above the bellows regulating the gas-supply thereto, openings for the discharge of water of condensation formed in the bottom of the bellows-chambers, valves at said openings, means whereby the last-mentioned valves may be operated at intervals by the bellows and chambers under said openings for trapping the water temporarily.

5. The dry meter having measuring-bellows and chambers, valves located above the bellows regulating the gas-supply thereto, openings for the discharge of water of condensation formed in the bottom of the bellows-chambers, valves at said openings, means whereby the last-mentioned valves may be operated at intervals by the bellows, chambers under said openings for trapping the water temporarily, and valves operated from the bellows and serving to discharge the water from said trapping-chambers.

6. The combination with a gas-meter of openings for draining off the water of condensation, valves controlling such openings, means for operating said valves and chambers under the openings for trapping the water temporarily, the discharge from such chambers being also controlled by automatic valves.

7. The combination with a gas-meter of openings for draining off the water of condensation, chambers under such openings adapted to trap the water temporarily, valves controlling said openings valves controlling the discharge from the trapping-chambers and means for operating said valves, said valves being open alternately.

8. In a gas-meter, the bellows-chamber whereof has a bottom opening for discharging water of condensation, a trapping-chamber receiving the water from said opening, a spring-operated valve at said opening, a spring operating-valve at the discharge from said trapping-chamber, and means whereby said valves are caused to open alternately.

9. In a gas-meter, the bellows-chamber whereof has a bottom opening for discharging water of condensation, a trapping-chamber receiving the water from said opening, valves controlling the entrance of the water into and its discharge from said trapping-chamber, and means whereby the valves are made to open alternately and to close alternately.

10. The combination with a dry meter and the house-supply pipe leading therefrom, of a water-passage conducting the water of condensation from said pipe to the diaphragm-chamber of the meter, and a check-valve in said passage whereby the condensation water in said pipe flows into the meter whenever an excessive amount accumulates in the former.

11. The combination with a dry meter and the house-supply pipe leading therefrom, of means for drawing off water of condensation from the diaphragm-chamber of the meter, a water-passage leading from said pipe to the diaphragm-chamber, and a check-valve in said passage adapted to yield whenever the water-pressure in the pipe becomes excessive.

KIRK R. HOWARD.

Witnesses:
H. M. MUNDAY,
EDW. S. EVARTS.